(12) United States Patent
Fam et al.

(10) Patent No.: US 11,698,436 B2
(45) Date of Patent: Jul. 11, 2023

(54) RADAR DEVICES AND METHODS USING MULTICARRIER LOGARITHMIC WARPED FREQUENCY DOMAIN CODE WAVEFORMS

(71) Applicant: The Research Foundation for The State University of New York, Amherst, NY (US)

(72) Inventors: Adly T. Fam, E. Amherst, NY (US); Alexander Byrley, Buffalo, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 296 days.

(21) Appl. No.: 17/084,624

(22) Filed: Oct. 29, 2020

(65) Prior Publication Data

US 2021/0149017 A1 May 20, 2021

Related U.S. Application Data

(60) Provisional application No. 62/927,475, filed on Oct. 29, 2019.

(51) Int. Cl.
*G01S 7/295* (2006.01)
*G01S 13/53* (2006.01)

(52) U.S. Cl.
CPC .............. *G01S 7/295* (2013.01); *G01S 13/53* (2013.01)

(58) Field of Classification Search
None
See application file for complete search history.

(56) References Cited

U.S. PATENT DOCUMENTS

2002/0030623 A1* 3/2002 Arikan ................. G01S 13/524
342/111

* cited by examiner

*Primary Examiner* — Whitney Moore
(74) *Attorney, Agent, or Firm* — Hodgson Russ LLP

(57) ABSTRACT

This disclosure introduces a mapping for creating good Doppler detection capable radar codes. The mapping transfers an existing digital radar code to the warped frequency domain by expressing the code elements as magnitudes and phases of selected frequencies. These frequencies are equispaced in the warped frequency domain to preserve the code's sidelobes after mapping. The frequency warping function may convert the multiplicative Doppler shift into an additive shift of the code pattern in the warped frequency domain, which allows Doppler shift detection.

13 Claims, 16 Drawing Sheets

(a)

(a)

(b)

RADAR DEVICES AND METHODS USING MULTICARRIER LOGARITHMIC WARPED FREQUENCY DOMAIN CODE WAVEFORMS

CROSS-REFERENCE TO RELATED APPLICATIONS

This application claims priority to U.S. Provisional Application No. 62/927,475, filed on Oct. 29, 2019, the disclosure of which is incorporated herein by reference.

FIELD OF THE DISCLOSURE

The present disclosure relates to radar devices.

BACKGROUND OF THE DISCLOSURE

A 'good' digital radar code is 'good' because it has small sidelobes (e.g., relative to a mainlobe). Unfortunately, many good codes are Doppler intolerant or Doppler shift detection incapable. A matched filter is therefore ineffective in detecting and tracking moving targets without additional structure such as Doppler filter banks, design criteria, or other processing. There continues to be a long-felt need a radar technique having good radar codes and are Doppler tolerant and/or can be used to detect Doppler shift.

BRIEF SUMMARY OF THE DISCLOSURE

The present disclosure provides multicarrier logarithmic warped frequency domain good code waveforms that are capable of Doppler detection. Warped domain codes are created via mapping a digital radar code to a warped frequency domain by expressing the code elements as magnitudes and phases of selected frequencies. These frequencies are uniformly spaced in the logarithmically warped frequency domain. This simultaneously preserves the code's sidelobes after mapping and allows Doppler shift detection. These codes can be transmitted as multicarrier waveforms, giving us multicarrier logarithmic warped frequency domain codes.

In some embodiments, a radar receiver takes an incoming signal and digitizes it with a high speed analog-to-digital convertor (ADC). The digital signal may be buffered so that a running Chirp Z-Transform can be used to compute a highly sampled Fourier spectrum. The positive half of spectrum is warped using Lanczos interpolation of the real and imaginary parts onto the warped frequency axis. A matched filter is run over the warped frequency variable to detect the signal and determine the Doppler shift.

The threshold for the warped frequency domain matched filter is also provided herein. A multibandpass filter, which may be a bank of bandpass filters, is shown to reduce the probability of false alarm even further. The multibandpass filter is shown to do this by reducing all energy (noise, interference, etc.) between the code elements in the frequency domain.

An ambiguity function is shown for three exemplary codes mapped onto multicarrier waveforms: Barker 4, Barker 11, and Frank 16. A plot shows that a delay may have deleterious effects on the matched filter output peak, leading to better time resolution for longer codes and those with more complex phase relationships. We show that for target speeds common in aerospace, a corresponding Doppler shift does not affect the mainlobe peak, but the peak may be damaged when the target speed approaches the speed of light. The time resolution is shown to be sharper than a traditional pulse compression waveform. Finally, it is shown that Doppler resolution improves with increasing signal length.

This disclosure introduces a mapping for creating good Doppler detection capable radar codes. The mapping transfers an existing digital radar code to the warped frequency domain by expressing the code elements as magnitudes and phases of selected frequencies. These frequencies are equispaced in the warped frequency domain to preserve the code's sidelobes after mapping. The frequency warping function converts the multiplicative Doppler shift into an additive shift of the code pattern in the warped frequency domain, which allows Doppler shift detection. These new Doppler shift detection capable codes are sometimes referred to herein Logarithmic Warped Domain Codes (LWDCs).

The present disclosure may be embodied as a radar receiver includes an analog-to-digital converter to sample a received radar signal at a sampling frequency to generate a digital signal; a transformer for converting the digital signal to a frequency domain signal; a warper configured to warp positive frequencies of each of a real component of the frequency domain signal and an imaginary component of the frequency domain signal onto a logarithmic frequency axis; a convolver configured to convolve a matched filter with the warped frequency domain signal; a thresholder configured to detect a target signal in the convolved signal. The radar receiver may further include a buffer configured to receive L samples of the digital signal.

The radar receiver may further include a multibandpass filter. For example, the multibandpass filter may have a plurality of zero-phase bandpass filters, wherein each of the bandpass filters has a center frequency at a different one of a plurality of carrier frequencies and a pre-determined bandwidth; and a combiner configured to combine a result of each bandpass filter.

The radar receiver may further include an antenna configured to receive the radar signal. The radar receiver may further include a shift calculator configured to calculate a Doppler shift of the target signal based on a difference between the warped frequency domain signal and the convolved signal.

The present disclosure may be embodied as a method for receiving radar signals, including converting a received radar signal to a digital signal at a sampling frequency; transforming the digital signal to a frequency domain signal; warping positive frequencies of each of a real component of the frequency domain signal and an imaginary component of the frequency domain signal onto a logarithmic frequency axis; convolving a matched filter with the warped frequency domain signal; and thresholding the convolved signal to detect a target signal.

The method may further include filtering the digital signal using a plurality of zero-phase bandpass filters, each having a center frequency at a different one of a plurality of carrier frequencies and a pre-determined bandwidth. The method may further include determining a Doppler shift of the detected target signal based on a difference between the target signal in the warped frequency domain signal and the convolved signal.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Figure 1:
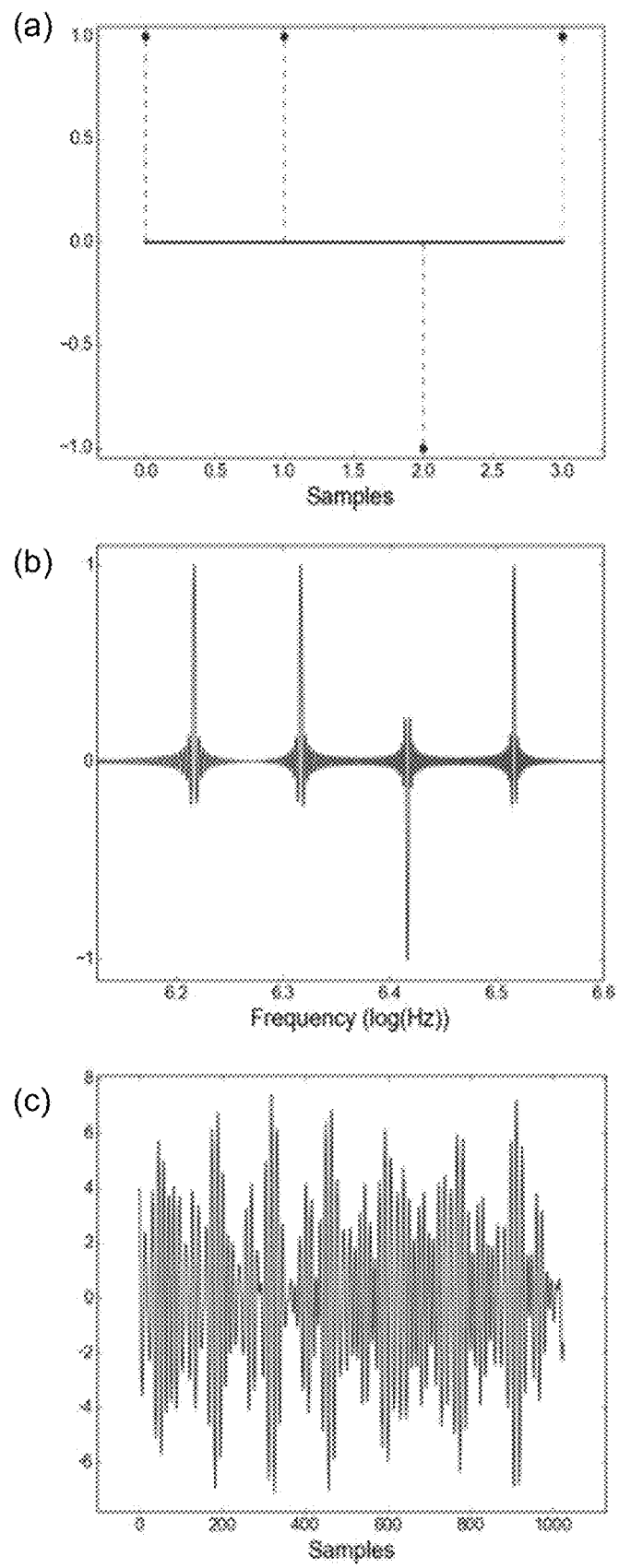
FIG. 1 (a) Digital Barker Code (b) Transmitted Waveform Warped Spectrum (c) Transmitted Waveform.

In an aspect, the present disclosure provides a method that maps any good biphase or polyphase code into a good Doppler tolerant and detection capable code. These codes are defined by expressing the code elements as magnitudes and phases of selected frequencies. These frequencies may be equispaced in the warped frequency domain to ensure the sidelobes are preserved after matched filtering in the warped frequency domain. The frequency warping function is chosen to be logarithmic, so that the multiplicative Doppler shift translates the matched filter output additively over the warped frequency variable.

Doppler detection may be done by comparing the shifted output peak to its expected location. Using this mapping, any good code can be used in the presence of Doppler without damaging its correlation properties while simultaneously providing an estimate of the Doppler shift.

Multicarrier Logarithmic Warped Domain Code Waveforms

A digital radar code is a discrete sequence $\{c\}=\{c_0, c_1, c_{N-1}\}$ of length N. A logarithmic warped domain code is a digital code mapped into the warped frequency domain. The warped domain code is created by mapping the radar code sequence $\{c\}=\{c_0, c_1, c_{N-1}\}$ onto a set frequencies $\{\xi\}=\{\xi_0, \xi_1, \ldots, \xi_{N-1}\}$ via:

$$\xi_n = e^{\log(\xi_r) + n\Delta\xi} \tag{1}$$

where $\xi_r \in \mathbb{R}_{++}$ is a constant reference offset, and $\Delta\xi \in \mathbb{R}_{++}$ a constant meant to space the frequencies equally in the warped domain. This mapping is defined over $\mathbb{R}_{++}$ because we assume that the maximum Doppler shift will not cause the frequencies to move out of the radar system's bandwidth. This bandwidth is assumed to be a subset of $\mathbb{R}_{++}$ because the signal we will transmit is real.

The magnitudes $|c_n|$ and phases $\angle c_n$ of each code element $c_n$ are mapped onto the frequency axis via:

$$c_n \to 2|c_n|\cos(2\pi\xi_n t + \angle c_n) \tag{2}$$

To transmit the code after mapping, its frequency domain image is converted into the time domain via a multicarrier waveform:

$$s(t) = 2\sum_{n=0}^{N-1} |c_n|\cos(2\pi\xi_n t + \angle c_n) \tag{3}$$

For transmission, the signal is windowed. Letting g(t) denote the window function, the transmitted signal is:

$$x_{tx}(t) = g(t) \cdot s(t) \tag{4}$$

Notice that the frequencies $\log(\{\xi\})$ are equally spaced, which means upon receiving (4), we take its Fourier transform and warp the linear frequency axis $\xi \to \log(\xi)$ to space the code elements equally over the frequency axis. Below, we show that this equispacing allows the wholesale importation of all the correlation properties of time domain codes into the warped frequency domain, while the logarithm function bestows Doppler detection capability. We call these newly constructed codes defined over the warped frequency axis Logarithmic Warped Domain Codes (LWDCs), which we also refer to herein as warped domain codes.

Example—Barker 4

Suppose that we wish to transmit a Barker code of length 4 using this waveform. The digital code is:

$$\{c\}=\{1,1,-1,1\} \tag{5}$$

Choosing $\xi_r = \log(500 \cdot 10^6)$, and $\Delta\xi=0.1$, the frequency set $\{\xi\}$ is:

$$\{\xi\}=\{500, 553, 611, 675\} \cdot 10^6 \tag{6}$$

In this non-limiting example, we chose $$g(t) = rect\left(\frac{t}{T_p}\right),$$

where $T_p$ is the pulse length. The digital Barker code, its warped frequency spectrum representation, and the resulting warped domain code time domain waveform (4) are shown in FIG. 1.

This example was implemented by downshifting the frequencies so that $\xi_r = \log(500)$. The resulting downshifted multicarrier signal was sampled at a rate $f_s=8000$. This was useful to store and manipulate the example's spectrum on a personal computer.

The Preservation of the Digital Code Sidelobes

The autocorrelation of the mapped code elements over the warped frequency variable has sidelobes with the same mainlobe to sidelobe height ratio as the autocorrelation of the original digital code over the discrete time variable.

To show this, we note that a discrete radar code $\{c\}$ can be represented as a function in the following form:

$$c[n] = c_0\delta[n] + c_1\delta[n-1] + \ldots + c_{N-1}\delta[n-(N-1)] \tag{7}$$

where $\delta[n]$ is the Kronecker delta. $\delta[n]$ is acting as a delay operator over the discrete time axis n. We make this connection explicit by defining the delay notation:

$$\delta[n \pm n_0] \triangleq q^{\pm n_0} \tag{8}$$

Using this notation, the sequence can be represented by the function:

$$c(q) = c_0 + c_1 q^{-1} + \ldots + c_{N-1} q^{-(N-1)} \quad (9)$$

$$c(q) = \sum_{n=0}^{N-1} |c_n| e^{j \angle c_n} q^{-n}$$

The autocorrelation of the sequence {c} in delay notation is therefore:

$$R_{cc}(q) = c(q) \cdot c^*(q^{-1}) \quad (10)$$

where * represents complex conjugation. The warped domain code over the axis $\log(\xi)$ is:

$$C(\log(\xi)) = \sum_{n=0}^{N-1} |c_n| e^{j \angle c_n} \delta(\log(\xi) - \xi_r - n\Delta\xi) \quad (11)$$

Notice that we can also express:

$$\delta(\log(\xi) \pm \xi_n) \triangleq q^{\pm \xi_n} \quad (12)$$

Which means we can express our mapped code as:

$$C(q) = \sum_{n=0}^{N-1} |c_n| e^{j \angle c_n} q^{-\xi_r - n\Delta\xi} = q^{-\xi_r} c(q^{\Delta\xi}) \quad (13)$$

The autocorrelation of C(q) is:

$$R_{CC}(q) = C(q) \cdot C^*(q^{-1}) = c(q^{\Delta\xi}) \cdot c^*(q^{-\Delta\xi}) \quad (14)$$

In other words:

$$R_{CC}(q) = R_{cc}(q^{\Delta\xi}) \quad (15)$$

This shows us that the autocorrelation of the corresponding warped domain code is just an expanded version of the autocorrelation of the digital code. The autocorrelation of the code sequence over the warped axis will therefore have the same sidelobe and mainlobe ratios, the only difference being the sidelobes will be located at a greater distance from the mainlobe. The properties of the logarithm were not used at all in this derivation. This property is therefore a direct result of the equispacing over the warped axis.

Doppler Detection Capability

A Doppler shift experienced by the transmitted time domain realization of the warped domain code causes an additive shift of the warped domain code over the logarithmic frequency axis. Since we designed the frequency set {$\xi$}, we can estimate the Doppler shift by locating the Doppler shifted reference frequency via convolutional matched filtering in the warped domain and then subtracting the original reference frequency from the location of the matched filter's output's peak.

Suppose that the signal experiences an unknown Doppler shift. The frequencies of the signal are now of the form:

$$\xi_{n_d} = \frac{c + v_r}{c + v_t} \xi_n = d \cdot \xi_n \quad (16)$$

where c is the speed of light, $v_r$ is the velocity of the receiver, and $v_t$ is the velocity of the target. The Doppler shifted waveform is:

$$s_d(t) = 2 \sum_{n=0}^{N-1} |c_n| \cos(2\pi \xi_{n_d} t + \angle c_n) \quad (17)$$

The logarithmic frequency representation of this signal is:

$$S_{d_\infty}(\log(\xi)) = \sum_{n=0}^{N-1} |c_n| e^{j \angle c_n} \delta(\log(\xi) - \log(\xi_{n_d})) \quad (18)$$

where the $\infty$ symbol is used to emphasize the infinite length of (17). Due to the properties of the logarithm and the definition of {$\xi$} in (1), we have:

$$\log(\xi_{n_d}) = \log(d) + \xi_r + n\Delta\xi \quad (19)$$

(18) is maximized when:

$$\log(\xi) - \log(d) - \xi_r - n\Delta\xi = 0 \quad (20)$$

So if we define:

$$M(\log(\xi)) = \sum_{n=0}^{N-1} |c_n| e^{j \angle c_n} \delta(\log(\xi) - n\Delta\xi) \quad (21)$$

Then the function $$T_\infty(\log(\xi)) = S_{d_\infty}(\log(\xi)) * M^*(-\log(\xi)) \quad (22)$$

Will have:

$$\text{argmax } T_\infty(\log(\xi)) = \{\xi_r + \log(d)\} \quad (23)$$

Since we know $\xi_r$, we can estimate the doppler shift d via:

$$d = \frac{e^{\text{argmax} T_\infty(\log(\xi))}}{e^{\xi_r}} \quad (24)$$

Example—Barker 4

In this example, we will show that the crosscorrelation of a Doppler shifted Barker 4 warped domain code (18) with its matched filter (21) is simply the additively translated and expanded autocorrelation of the digital code it is built from. This will illustrate the concepts from the above Sections titled "Preservation of the Digital Code Sidelobes" and "Doppler Detection Capability" simultaneously. To begin, we use delay notation to represent a digital Barker 4 code as:

$$c(q) = c_0 + c_1 q^{-1} - c_2 q^{-2} + c_3 q^{-3} = 1 + q^{-1} - q^{-2} + q^{-3} \quad (25)$$

The autocorrelation of Barker 4 is:

$$R_{cc}(1+(q) = (1 + q^{-1} - q^{-2} - q^{-3}) \cdot (1 + q^1 - q^2 + q^3) \quad (26)$$

$$R_{cc}(q) q^3 - q^1 + 4 - q^{-1} + q^{-3} \quad (27)$$

The Doppler shifted warped domain code over the warped frequency variable is:

$$C(q) = q^{-\xi_r} q^{-\log(d)} (1 + q^{-\Delta\xi} - q^{-2\Delta\xi} + q^{-3\Delta\xi}) \quad (28)$$

Defining the matched filter in delay notation gives us:

$$M(q) = 1 + q^{-\Delta\xi} - q^{-2\Delta\xi} + q^{-\Delta\xi} \quad (29)$$

Their crosscorrelation is:

$$R_{CM}(q) = q^{-\xi r} q^{-\log(d)} (1 + q^{-\Delta\xi} - q^{-2\Delta\xi} + q^{-3\Delta\xi}) \cdot (1 + q^{\Delta\xi} - q^{2\Delta\xi} + q^{3\Delta\xi}) \quad (30)$$

$$R_{CM}(q) = q^{-\xi r} q^{-\log(d)} (q^{3\Delta\xi} - q^{\Delta\xi} + 4 - q^{-\Delta\xi} + q^{-3\Delta\xi}) \quad (31)$$

So if we expand $R_{cc}(q)$ by $\Delta\xi$:

$$R_{cc}(q^{\Delta\xi}) = q^{3\Delta\xi} - q^{\Delta\xi} + 4 - q^{-\Delta\xi} + q^{-3\Delta\xi} \quad (32)$$

So therefore:

$$R_{CM}(q) = q^{-\xi r} q^{-\log(d)} R_{cc}(q^{\Delta\xi}) \quad (33)$$

Figure 2:
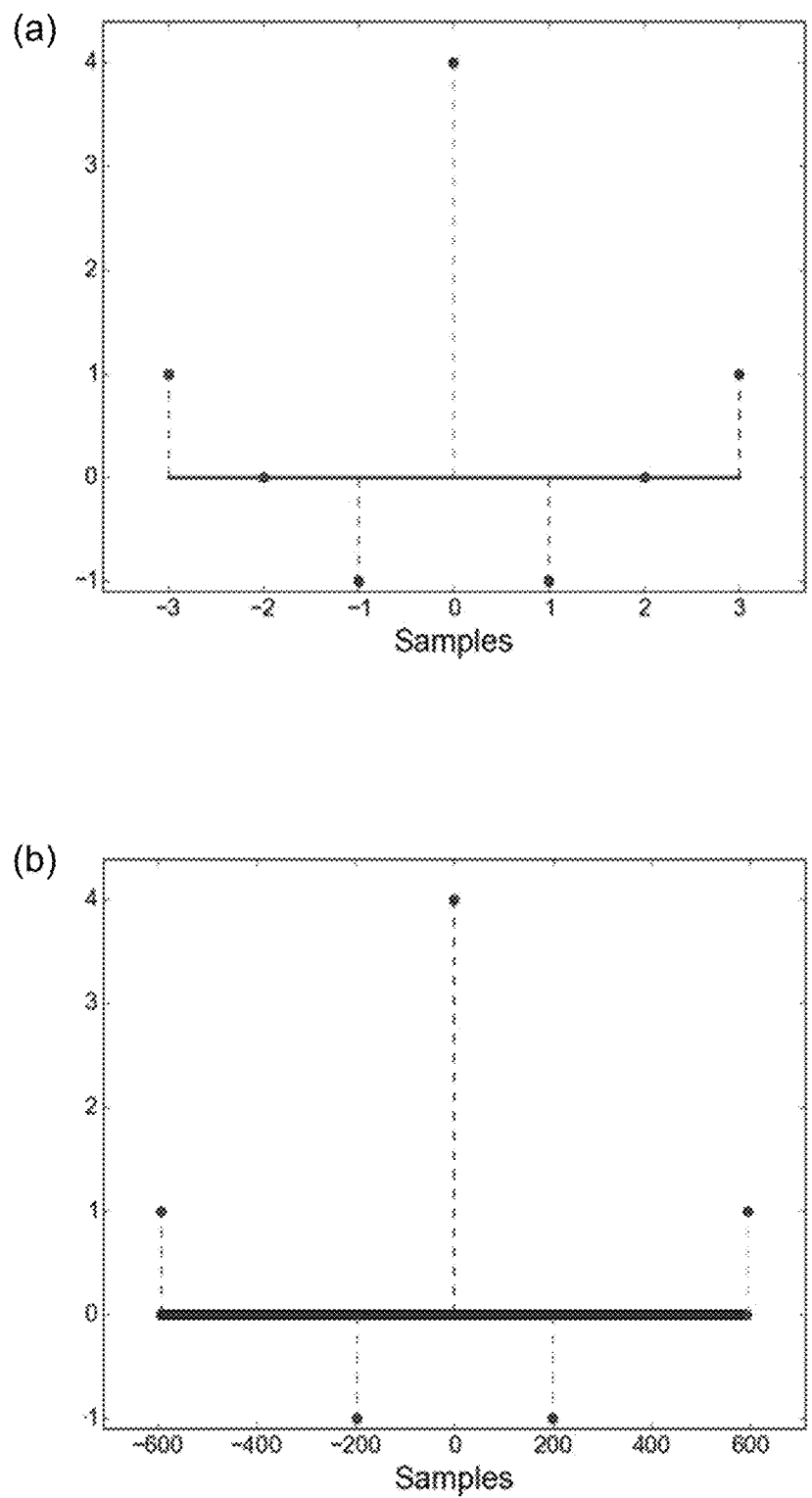
FIG. 2: (a) Digital Code Autocorrelation (b) Warped Domain Code Autocorrelation.
Figure 3:
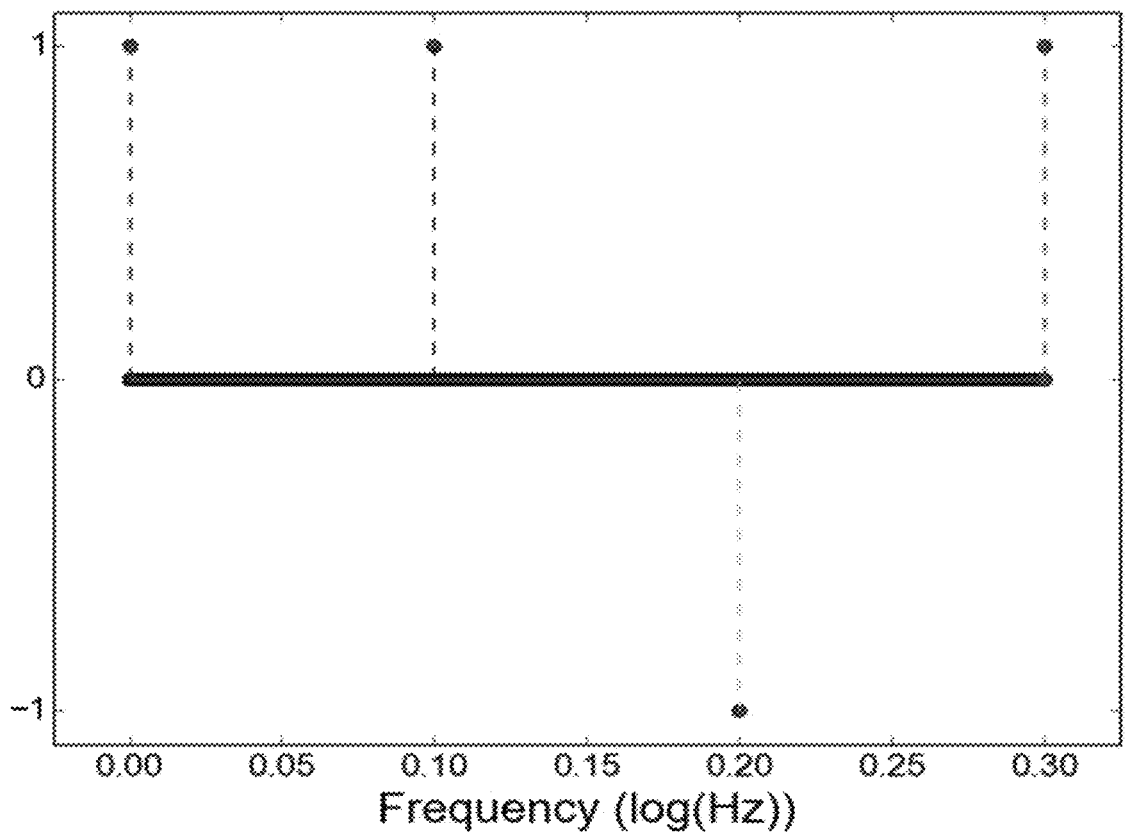
FIG. 3: Matched Filter M(log(t)).

FIG. 2 shows the plots of the autocorrelations of the digital and warped domain codes. It shows the warped domain code's autocorrelation is indeed identical to the digital code's autocorrelation, save for the increased distance between the sidelobes.

The Effects of Sampling and Finite Length

In this section we show how windowing and sampling the signal effects the sidelobes and Doppler detection. We assume that we have sampled (17) highly enough to prevent aliasing. We consider therefore only the zero-centered Nyquist interval, which contains all the spectral values of interest.

Windowing and sampling gives us a discrete time function $x_d[n]$ of length L. Within the warped Nyquist interval, its spectrum is:

$$X_{d_L}(\log(\xi)) = \sum_{n=0}^{N-1} |c_n| e^{j\angle c_n} G_L(\log(\xi) - \log(\xi_{n_d})) \quad (34)$$

Where $G_L(\log(\xi))$ is the length L Warped Fourier transform of the window function. This spectrum is shown in the second panel of FIG. 1 as described above after normalizing by L. To compute the output of the matched filter for the finite length case, we recognize that we can represent this spectrum as:

$$X_L \log(\xi)) = G_L(\log(\xi)) * X_{d_\infty}(\log(\xi)) \quad (35)$$

Its matched filter is described by:

$$M(\log(\xi)) = \sum_{n=0}^{N-1} |c_n| e^{j\angle c_n} \delta(\log(\xi) - n\Delta\xi) \quad (36)$$

Therefore the matched filter output will be:

$$T_L(\log(\xi)) = X_L(\log(\xi)) * M^*(-\log(\xi))$$

$$T_L(\log(\xi)) = G_L(\log(\xi)) * S_{d_\infty}(\log(\xi)) * M^*(-\log(\xi))$$

$$T_L(\log(\xi)) = G_L(\log(\xi)) * T_\infty(\log(\xi)) \quad (37)$$

When $G_L(\cdot)$ is even and takes its maximum at zero, we will have:

$$\text{argmax } T_L(\log(\xi)) = \{\xi, +\log(d)\} \quad (38)$$

Therefore, the Doppler detection and sidelobe preservation properties are preserved. $T_L(\log(\xi))$ is shown in FIG. 4 for two different values of L.

Figure 4:
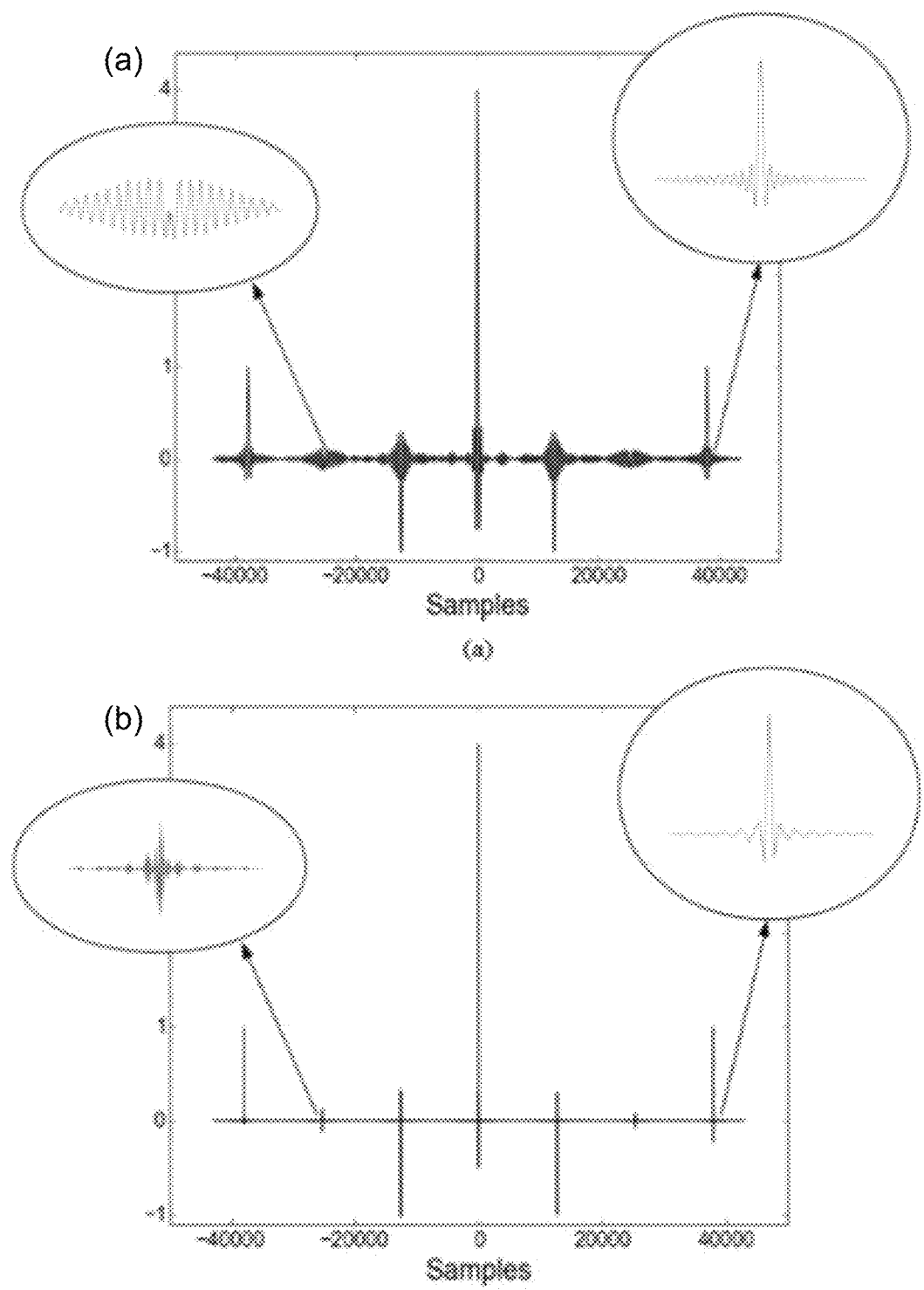
FIG. 4: $T_L(\log(\xi))$ (a) L=212; (b) L=220.

FIG. 4 was created by mapping (5) onto (4) via (1,2), sampling the resulting waveform above Nyquist after windowing with a rectangular window, computing the warped spectra via Lanczos interpolation of the Discrete Fourier Transform, and convolving the spectra with their matched filters. Comparing the two panels illustrates that as L grows, the output becomes more ideal.

FIG. 4 also shows small amplitude sidelobes that were not present in the ideal autocorrelation. These new sidelobes are a result of the waveform's warped frequency domain spectrum not cancelling completely during matched filtering. FIG. 1(*b*) shows that the sidelobes of each sinc peak combine to produce an uneven spectrum between the peaks. The unwanted sidelobes are reduced as L grows because the sinc functions approach delta functions that cancel more completely.

Figure 5:
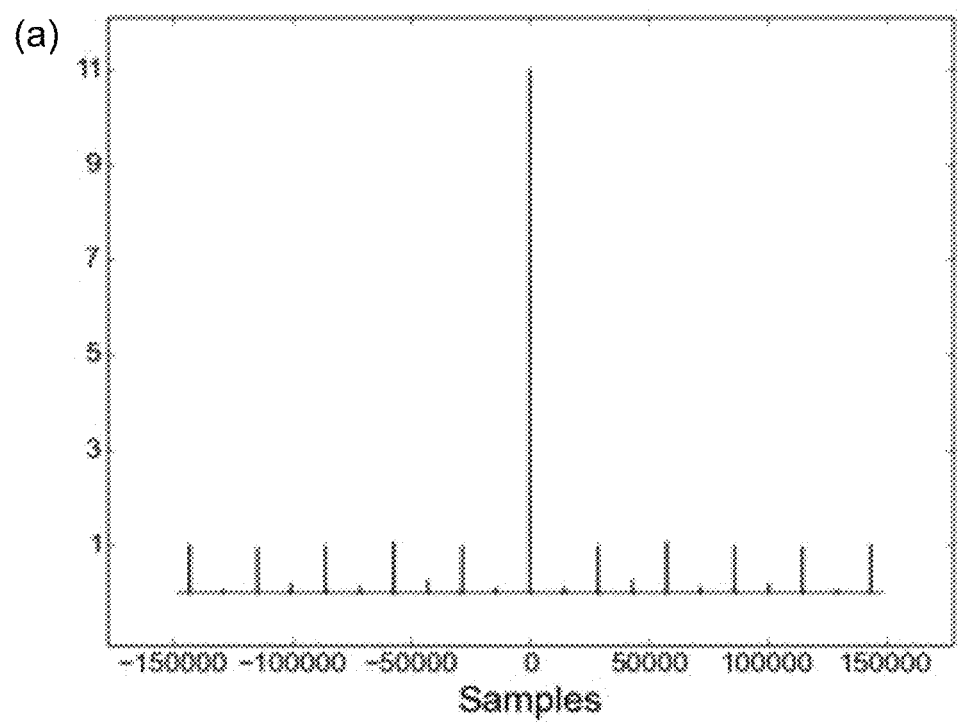
FIG. 5: $T_L(\log(\xi))$ L=$2^{20}$ (a) Barker 11; (b) Frank 16.
Figure 5:
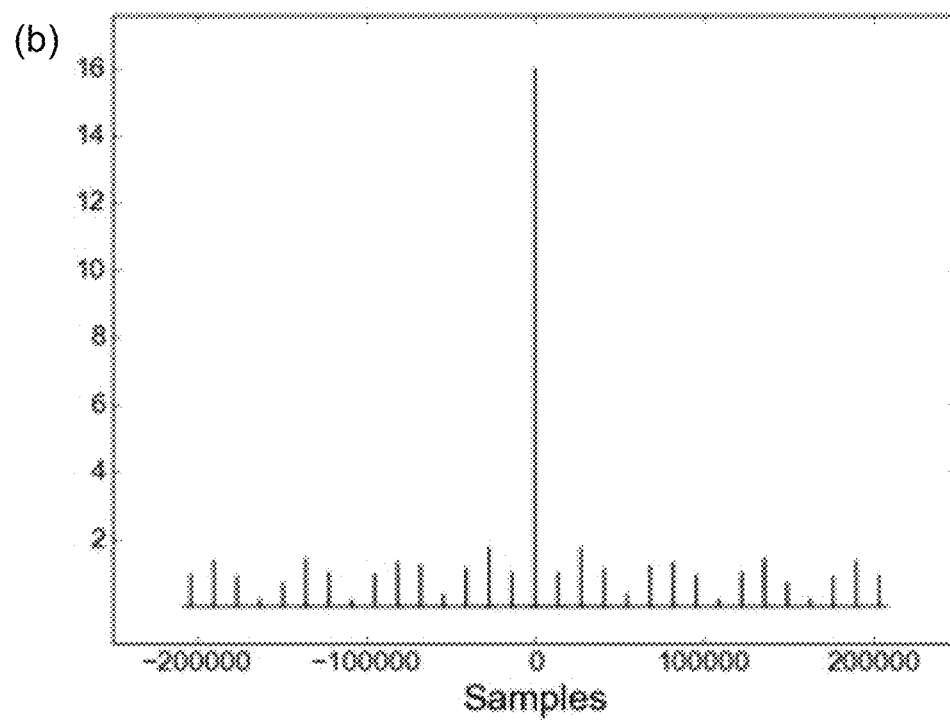

These unwanted sidelobes will always be present because the Warped DFT does not represent an orthogonal transformation when the signal has finite length. We will therefore never compute a discrete warped spectrum. The best we can do is control their magnitude. This means that longer codes will require longer waveforms. FIG. 5 shows the absolute value of the matched filter output for Barker 11 and Frank 16. By picking L large enough, the magnitude of these unwanted sidelobes is controlled.

Radar Receiver

The concept of Multicarrier Logarithmic Warped Domain Code Waveforms is described above. A Logarithmic Warped Domain Code Waveform is created by expressing a digital code's elements as magnitudes and phases of selected frequencies that are transmitted simultaneously. These frequencies are uniformly spaced after a logarithmic warping of the frequency axis. This mapping preserves the digital code's autocorrelation after convolutional matched filtering in the warped frequency domain while imbuing Doppler detection capability. Now we turn to an embodiment of a receiver for these waveforms.

In an embodiment, the receiver buffers the digitized incoming signal and utilizes a running Chirp Z-Transform (CZT) along the unit-circle after zero-phase 'multibandpass' filtering to suppress noise and interference. The spectrum of the filtered signal is then warped according to the logarithmic mapping. The receiver then performs simultaneous signal and Doppler detection via a convolutional matched filter in the logarithmic frequency domain.

Receiver Structure

An estimate of the Doppler shift is only useful when the signal is present. If we use the matched filter in the warped frequency domain to detect the signal's presence, we can determine the estimate's utility. The Doppler shift estimate will only be considered valid if the matched filter output peak also crosses the threshold for signal detection.

Figure 7A:
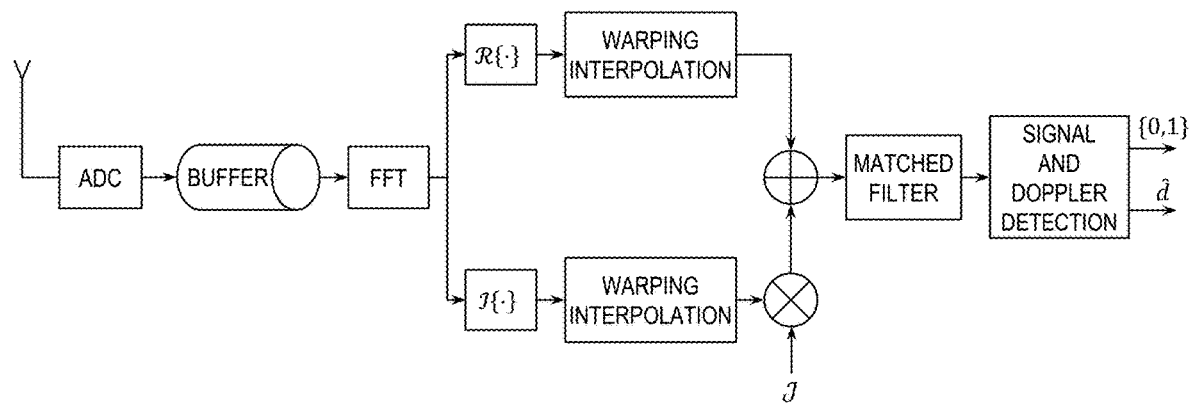
FIGS. 7A and 7B are diagrams of exemplary warped domain code receivers/methods according to embodiments of the present disclosure.
Figure 7B:
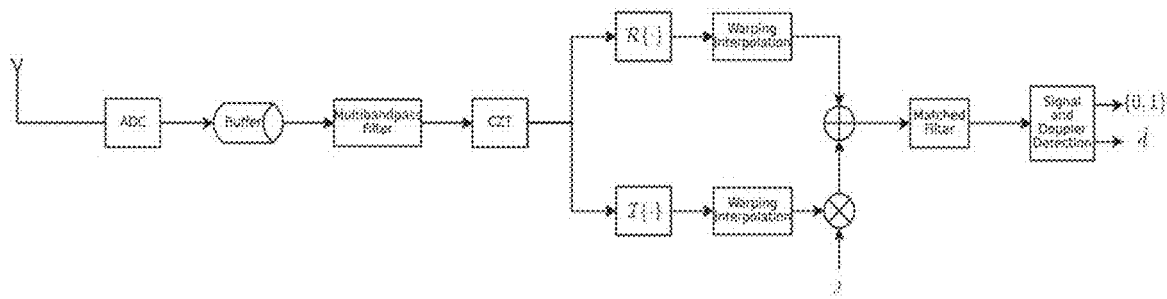

An exemplary receiver for these warped domain codes represented in the time domain via (4) is shown in FIG. 7. We take a running Short Time Fourier Transform (STFT) of the incoming data after converting it into a digital form via an Analog-to-Digital Converter (ADC). The length of the STFT window is the length of the transmitted signal L.

Figure 6:
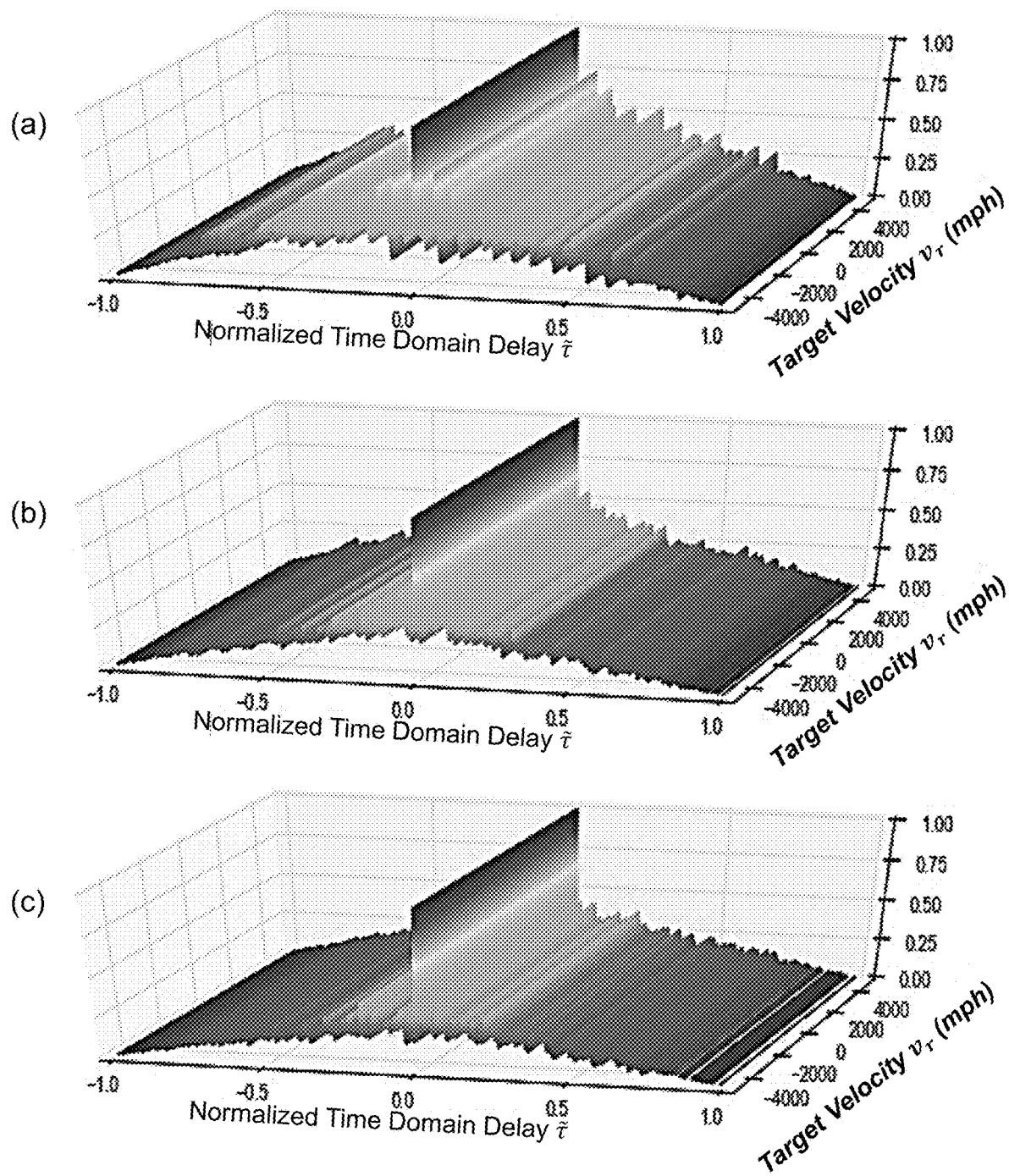
FIG. 6: Receiver Ambiguity Function (a) Barker 4; (b) Barker 11; (c) Frank 16.

We can define an ambiguity function $A(\tilde{\tau}, d)$ based on the Doppler shift d and the relative position $\tilde{\tau}$ of the signal inside the STFT window. The signal will either be completely inside the STFT window $\tilde{\tau}=0$, completely outside of it $|\tilde{\tau}|\geq 1$, or partially within the window $\tilde{\tau}\in(0,1)$. Therefore the ambiguity function, shown in FIG. 6, is defined as:

$$\chi(\tilde{\tau}, d) = X_{d_L}(\log(\xi)) e^{-j2\pi \log(\xi) \cdot T_p \tilde{\tau}} * M^*(-\log(\xi)) \quad (39)$$

The absolute delay $\tau = T_p \tilde{\tau}$ causes a linear phase term to be added to the phases of the warped domain code elements. Since the matched filter does not expect this change in phase, the matched filter is no longer matched, leading to a smaller output peak. FIG. 6 shows that this phase mismatch is more pronounced for longer codes, e.g., Barker 11 and Frank 16, and codes with more complex phase sets, e.g., Frank 16.

We can increase the time resolution of our receiver by using the detected Doppler shift to modify a traditional phase coded pulse compression waveform that we send after the multicarrier waveform. The idea is to combine the time resolution ability of phase coded pulse compression waveforms with the Doppler detection capability of the warped domain code waveforms presented here. We plan to investigate combination pulse trains of this type in future research.

Further Receiver Description

FIG. 7 shows a block diagram of an embodiment of the presently-disclosed receiver. Reception begins by digitizing the incoming waveform. This may be done directly using a high-speed Analog-to-Digital Converter (ADC), or otherwise. We assume that at the receiver sampling rate, the transmitted signal is L samples long. Every L samples are therefore placed into a buffer, and one sample is shifted out at a time. We process the following digital signal:

$$x_{rx}[l] = \sum_{m=0}^{M-1} \alpha_m x_{tx_d}[l - l_m] + v[l] \quad (40)$$

where $\alpha_m \in \mathbb{R}_{++}$ represents the mth scatterer coefficient and $x_{tx_d}[l-l_m]$ is digitized Doppler shifted signal corresponding to the mth scatterer.

To derive the detector, we assume that the mth scatter is dominant within the L sample window, the return is contained entirely within the window, and it has zero delay relative to the start of the window. The Discrete Time Fourier Transform (DTFT) is then:

$$X_{rx}(\xi) = \alpha_m \sum_{n=0}^{N-1} |c_n| e^{j \angle c_n} G(\xi - d\xi_n) + V(\xi) \quad (41)$$

where d is the Doppler shift, G(ξ) is window's DTFT, and V(ξ) is the noise spectrum. The time domain signal is passed through a bank of zero-phase finite impulse response (FIR) bandpass filters. Each filter is centered where one carrier is expected with a bandwidth that accommodates the maximum expected Doppler shift. This bank bandpass filtering is termed multibandpass filtering in this paper. The filters are zerophase to avoid phase distortions during matched filtering in the warped frequency domain.

The spectrum is warped by discarding its negative half, splitting what remains into its real and imaginary parts, and warping each according to (1). Letting θ=log(ξ), the real valued warped spectral components are combined to produce the complex warped spectrum:

$$X_{rx}(\vartheta) = \quad (42)$$
$$\alpha_m \sum_{n=0}^{N-1} |c_n| e^{j\angle c_n} |H_n|^2(\vartheta) G(\vartheta - n\Delta\xi - \log(d)) + \sum_{n=0}^{N-1} |H_n|^2(\vartheta) V(\vartheta)$$

where $|H_n|^2$ (θ) is the warped Fourier spectrum of the nth zero-phase bandpass filter. A matched filter is convolved with $X_{rx}(\theta)$ to determine the signal's presence and the corresponding Doppler shift. The matched filter is given by:

$$M(\vartheta) = \sum_{n=0}^{N-1} |c_n| e^{j\angle c_n} \delta(\vartheta - n\Delta\xi) \quad (43)$$

To make the decision of whether or not a signal is present, we threshold the output of the matched filter. The Doppler shift is unknown, therefore the test statistic is:

$$T = \max\{X_{rx}(\theta) * M^*(-\theta)\} \quad (44)$$

where M*(·) represents complex conjugation of the matched filter. It can be shown that the location corresponding to the maximum is the maximum likelihood estimate of the Doppler shifted reference frequency. T therefore represents the output of the matched filter when it is best aligned with the warped spectrum of the received signal.

In some embodiments, the Chirp Z-Transform (CZT) around the unit circle can be used as the computable realization of the DTFT. We assume that $v[l] \sim \mathcal{N}(0, \sigma_v^2) \forall l$ and they are independent and identically distributed (i.i.d.). After taking the CZT and normalizing the result by the signal length L, it is easy to show that $$V[\xi_k] \sim \mathcal{CN}\left(0, \frac{\sigma_v^2}{L}\right)$$

and are i.i.d. $\forall \xi_k$.

After warping the frequency axis, the noise is no longer independent. In other words, $$V[\vartheta_k] \sim \mathcal{CN}\left(0, \frac{\sigma_v^2}{L} C\right)$$

for some correlation matrix C. This correlation matrix is the correlation matrix of the Nonuniform Discrete Fourier Transform (NUDFT) basis functions that correspond to the warped frequencies. A simple inner-product calculation shows that:

$$c_{ij} = c_j = \frac{1 - e^{-j2\pi(\xi_i - \xi_j)L}}{1 - e^{-j2\pi(\xi_i - \xi_j)}} \quad (45)$$

where $c_{ij}$ is the i, jth element of C, and $c_i$ is the ith basis function of the NUDFT. As L→∞, $c_j$→0∀i,j. A simple computation shows that for L=$2^{12}$, $c_j \approx 10^{-2}$ when i≠j, so for practical purposes, $$V[\vartheta_k] \sim \mathcal{CN}\left(0, \frac{\sigma_v^2}{L}\right)$$

as well.

There are an innumerable number of models of clutter and target radar cross sections, and therefore $\alpha_m$. An optimal detector can be designed for each of these models. To reduce this complexity, we note that if we assume that $\alpha_m$ always takes its maximum-likelihood value, its effect is equivalent to modifying the SNR.

Under this assumption, T is a linear combination of Gaussian random variables, so T is itself a Gaussian random variable. This means we only need the mean and the variance of T to completely describe its probability distribution. Our hypothesis test is therefore:

$$T \sim \begin{cases} CN\left(0, \frac{\sigma_v^2}{L}\mathcal{E}\right), & \text{Under } H_0 \\ CN\left(\mathcal{E}, \frac{\sigma_v^2}{L}\mathcal{E}\right), & \text{Under } H_1 \end{cases} \quad (46)$$

where $\varepsilon = \max\{(\theta)^* M^*(-\theta)\}$. If we normalize the variance, we get:

$$T \sim \begin{cases} CN(0, 1), & \text{Under } H_0 \\ CN\left(\sqrt{L\frac{\mathcal{E}}{\sigma_v^2}}, 1\right), & \text{Under } H_1 \end{cases} \quad (47)$$

This means that the optimal threshold is:

$$\gamma = \sqrt{\frac{\sigma_v^2}{L}\mathcal{E}}\, Q^{-1}(P_{FA}) \quad (48)$$

where $Q(\cdot)$ is the Marcum Q-Function, and $P_{FA}$ is the desired probability of false alarm. The probability of detection is then:

$$P_D = Q\left(Q^{-1}(P_{FA}) - \sqrt{L\frac{\mathcal{E}}{\sigma_v^2}}\right) \quad (49)$$

The discussion above was for arbitrary polyphase codes. In case of biphase codes, we just need the real part of the Fourier transform. This means that for biphase codes, like the Barker code, $$V[k] \sim \mathcal{N}\left(0, \frac{\sigma_v^2}{2L}\right).$$

Therefore for biphase codes:

$$T \sim \begin{cases} N(0, 1), & \text{Under } H_0 \\ N\left(\sqrt{L\frac{\mathcal{E}}{\sigma_v^2}}, 1\right), & \text{Under } H_1 \end{cases} \quad (50)$$

$$\gamma = \sqrt{\frac{\sigma_v^2}{2L}\mathcal{E}}\, Q^{-1}(P_{FA}) \quad (51)$$

$$P_D = Q\left(Q^{-1}(P_{FA}) - \sqrt{2L\frac{\mathcal{E}}{\sigma_v^2}}\right) \quad (52)$$

Once T exceeds the threshold $\gamma$, the Doppler estimate is given by:

$$\hat{d} = \frac{e^{argmax\{T\}}}{\xi_r} \quad (53)$$

where argmax{T} is the location over $\theta$ that T takes its maximum. Due to the noise, the Doppler estimate will have error, so we interpolate $\hat{d}$ by fitting the thresholded T values with a 2nd degree polynomial. Unfortunately, even interpolation when $P_D=1$ is not sufficient to remove the error in the Doppler estimate. The error of the estimator is illustrated in the experiments section.

Multibandpass Filtering

Figure 8:
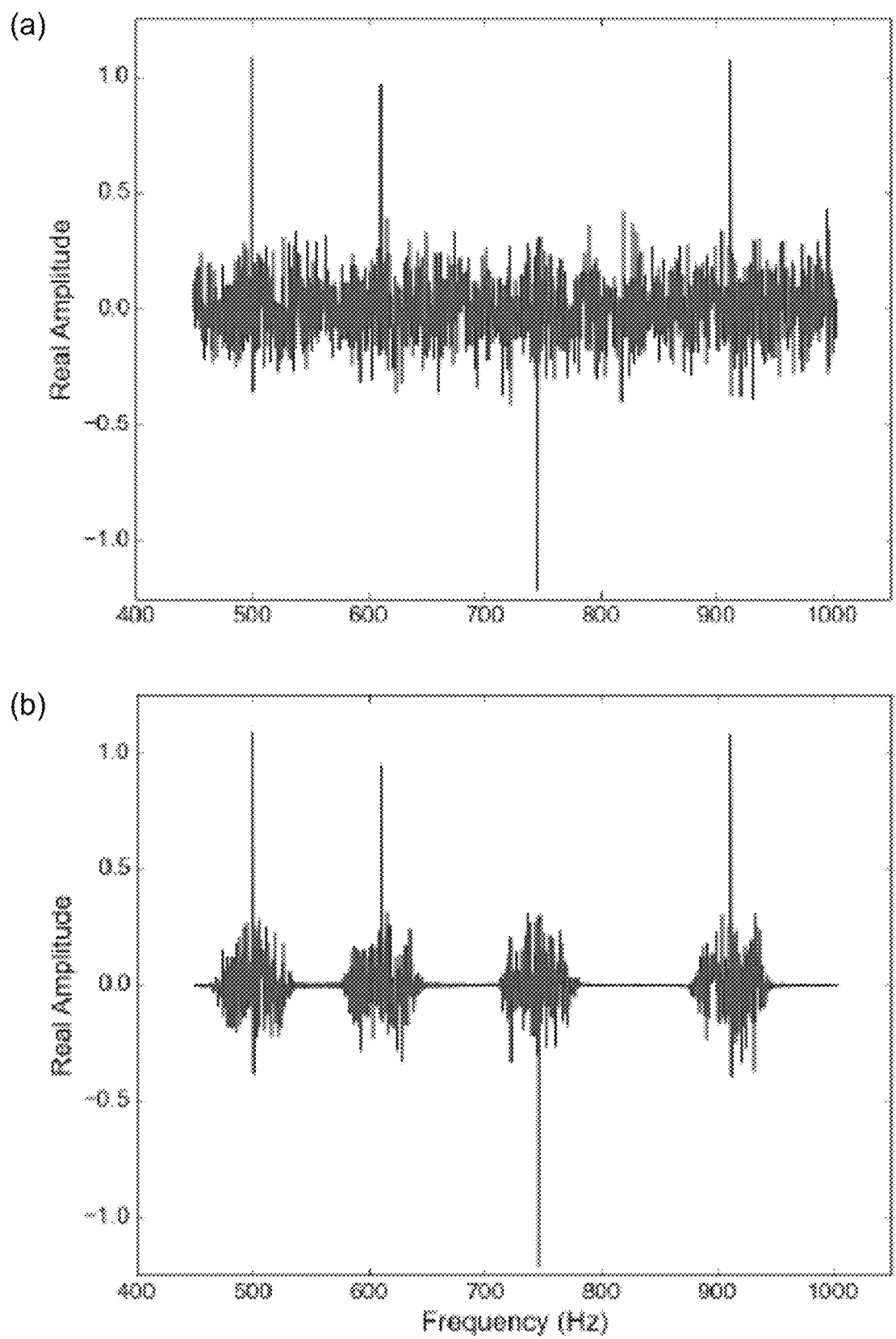
FIG. 8: Barker 4 Waveform Spectrum (a) Original (b) Multibandpass.
Figure 9:
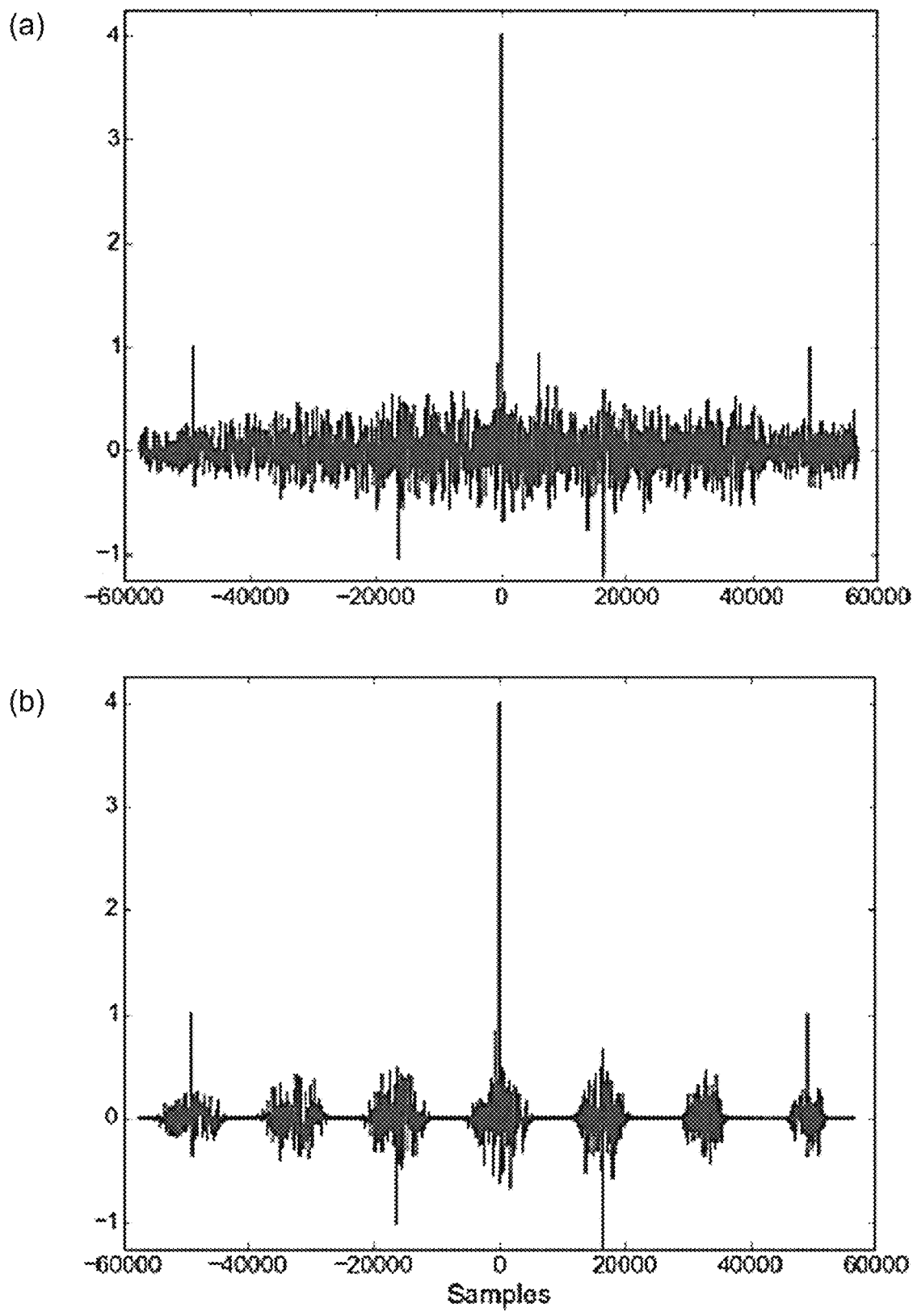
FIG. 9: Barker 4 Spectrum-Filter Crosscorrelation (a) Original (b) Multibandpass.

Multibandpass filtering means filtering with a bank of bandpass filters and combining the output of each bandpass filter. Each filter has a center frequency corresponding to a transmitted carrier and a bandwidth allowing for a maximum Doppler shift. What results is a spectrum where any energy, be it noise or a jammer, between the code elements is repressed. Multibandpass filtering therefore decreases the probability of false alarm. We can see the differences in FIG. 8 and FIG. 9.

The Ambiguity Function

We define the delay $\hat{\tau}$ of the ambiguity function relative to the window used to compute the CZT. The signal will either be completely inside the CZT window $\hat{\tau}=0$, completely outside of it $|\hat{\tau}|\geq 1$, or partially within the window $\hat{\tau}\in(0,1)$. We denote the Doppler shift as d as before. Our ambiguity function $\chi(\hat{\tau}, d)$, shown in FIG. 11 is therefore:

$$\chi(\hat{\tau},d) = X_{d_L}(\theta)e^{-j2\pi\theta\cdot T_p\cdot\hat{\tau}} * M^*(-\theta) \quad (54)$$

Figure 10:
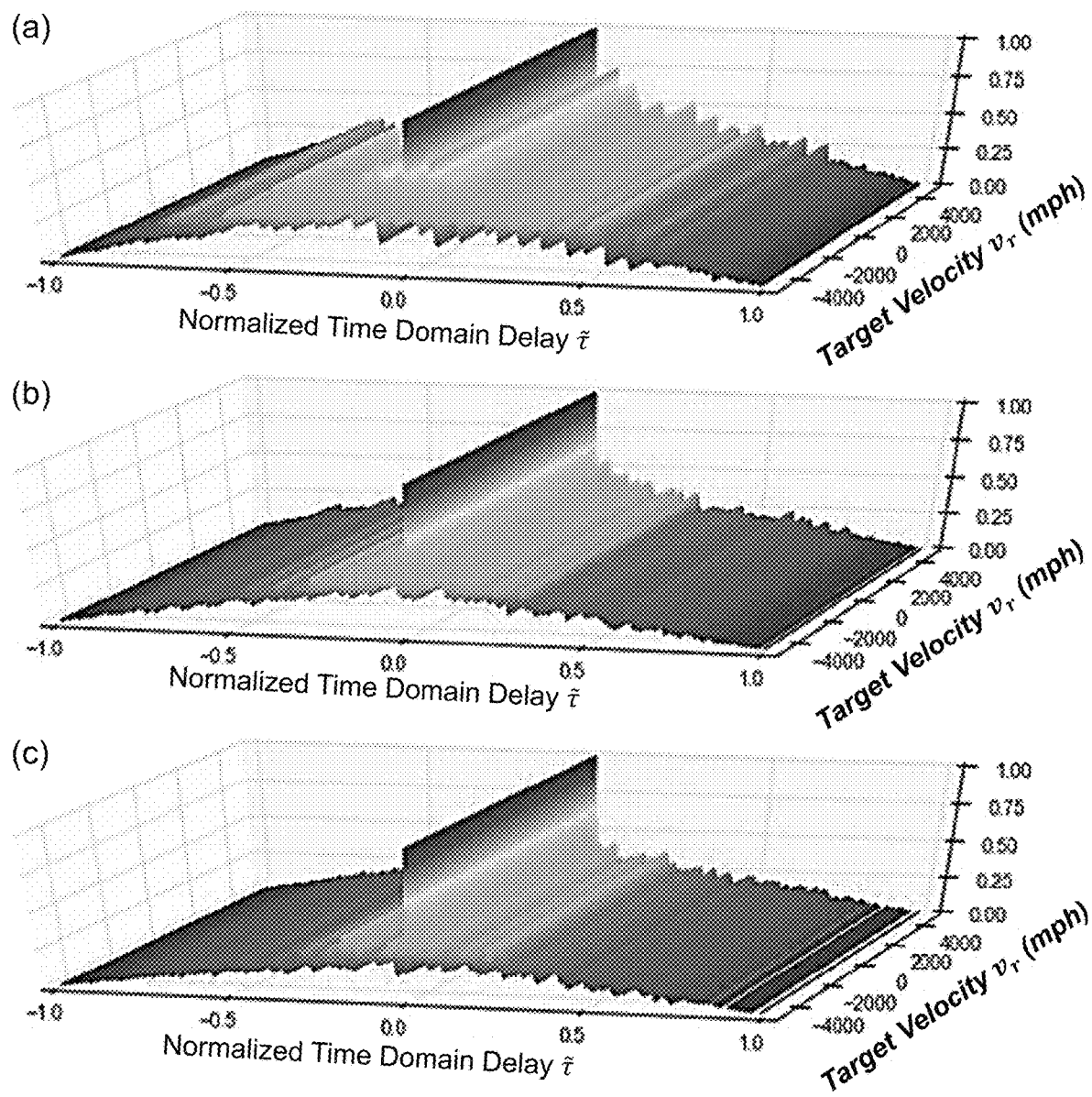
FIG. 10: Receiver Ambiguity Function (a) Barker 4; (b) Barker 11; (c) Frank 16.
Figure 11:
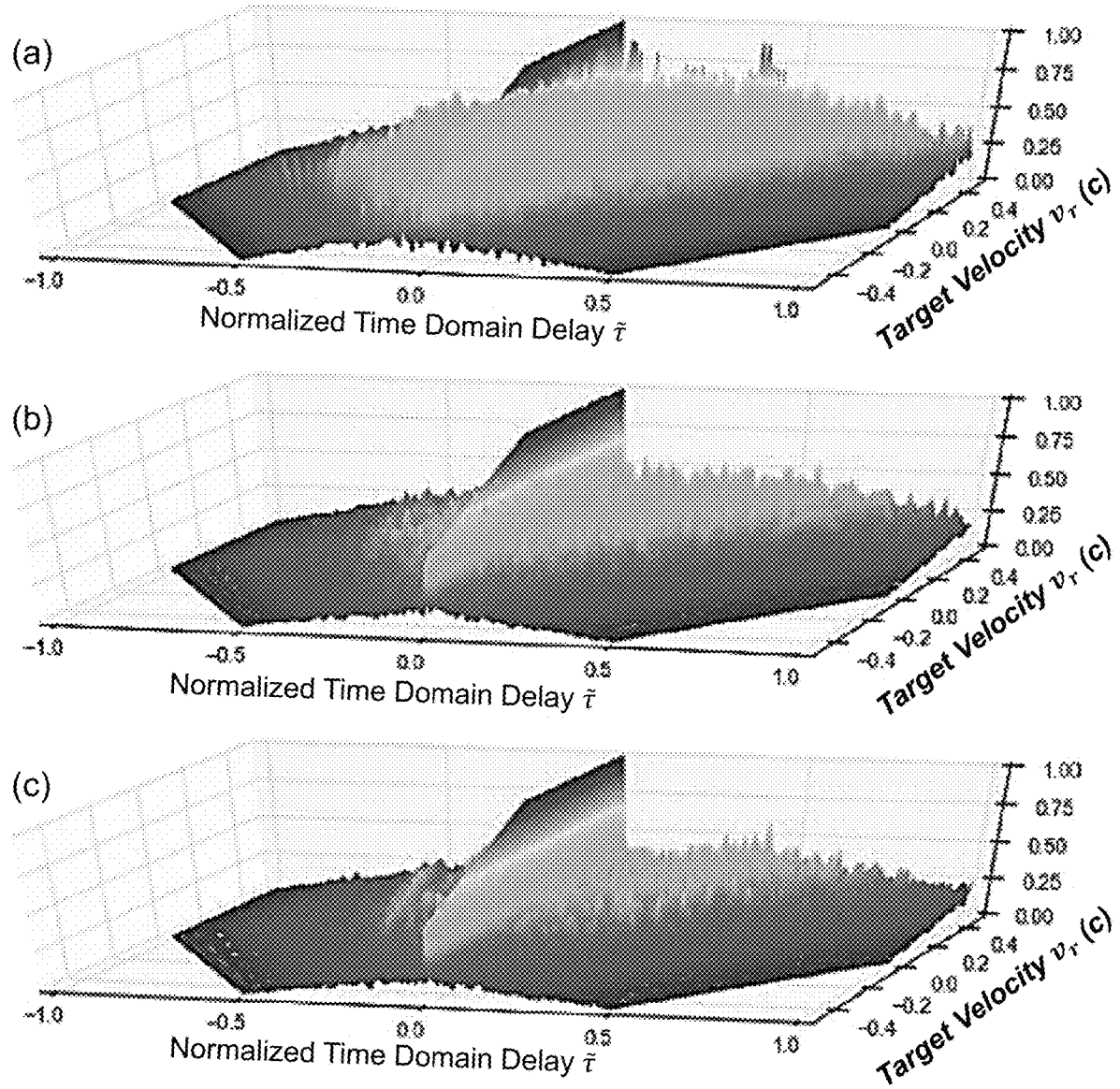
FIG. 11: Receiver Ambiguity Function (a) Barker 4; (b) Barker 11; (c) Frank 16.

We can see two plots of the ambiguity function in FIG. 10 and FIG. 11. FIG. 10 shows that for low target speeds, the peak of the ambiguity function does not change much. FIG. 11 shows that as the target speed approaches the speed of light, the matched filter peak decreases. However, this only happens in one direction, which is the direction when the target is approaching the radar. This is due to the increase in frequency compressing the waveform within the CZT window.

Figure 12:
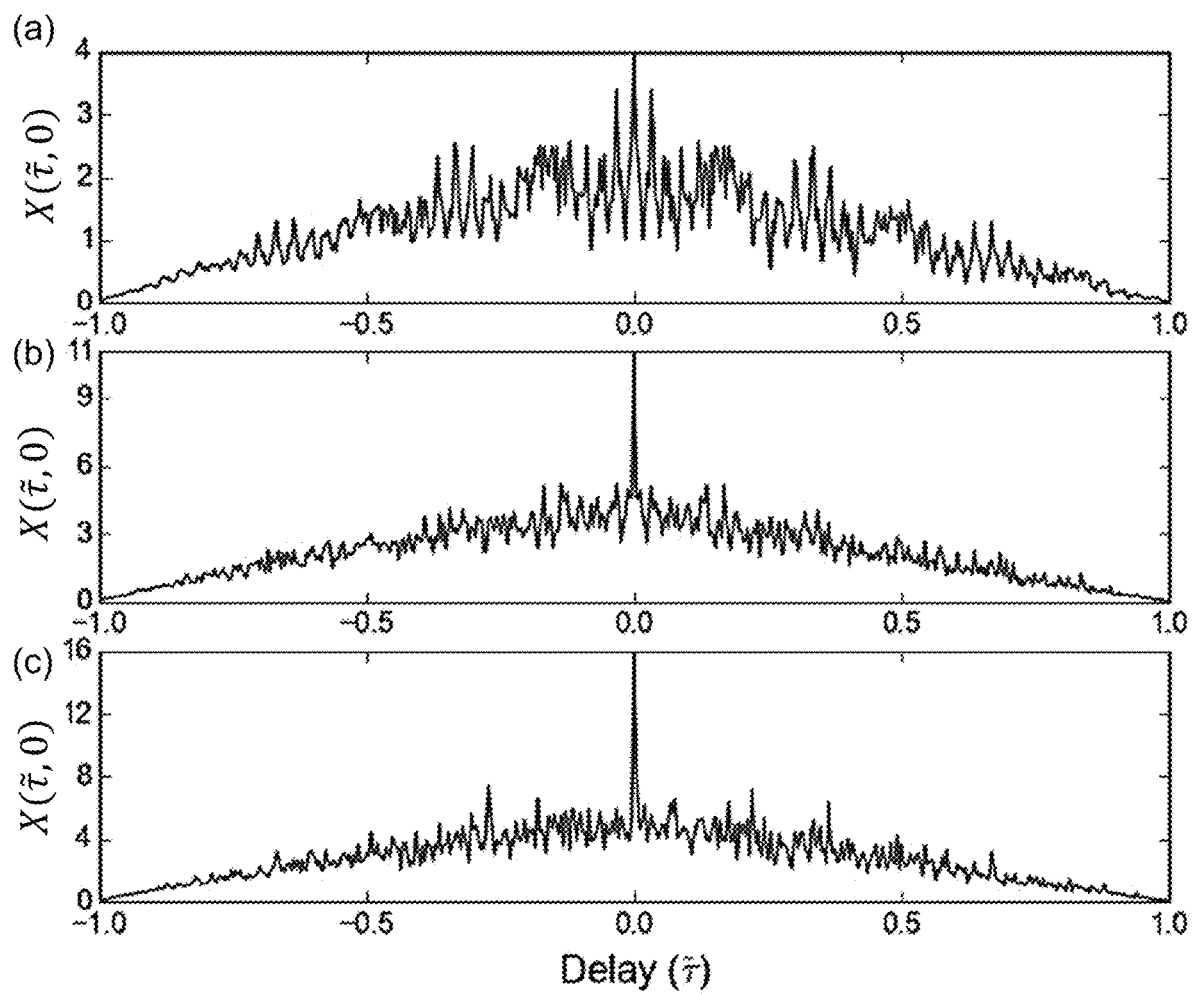
FIG. 12: Time Resolution Multicarrier Warped Domain Code (a) Barker 4; (b) Barker 11; (c) Frank 16.
Figure 14:
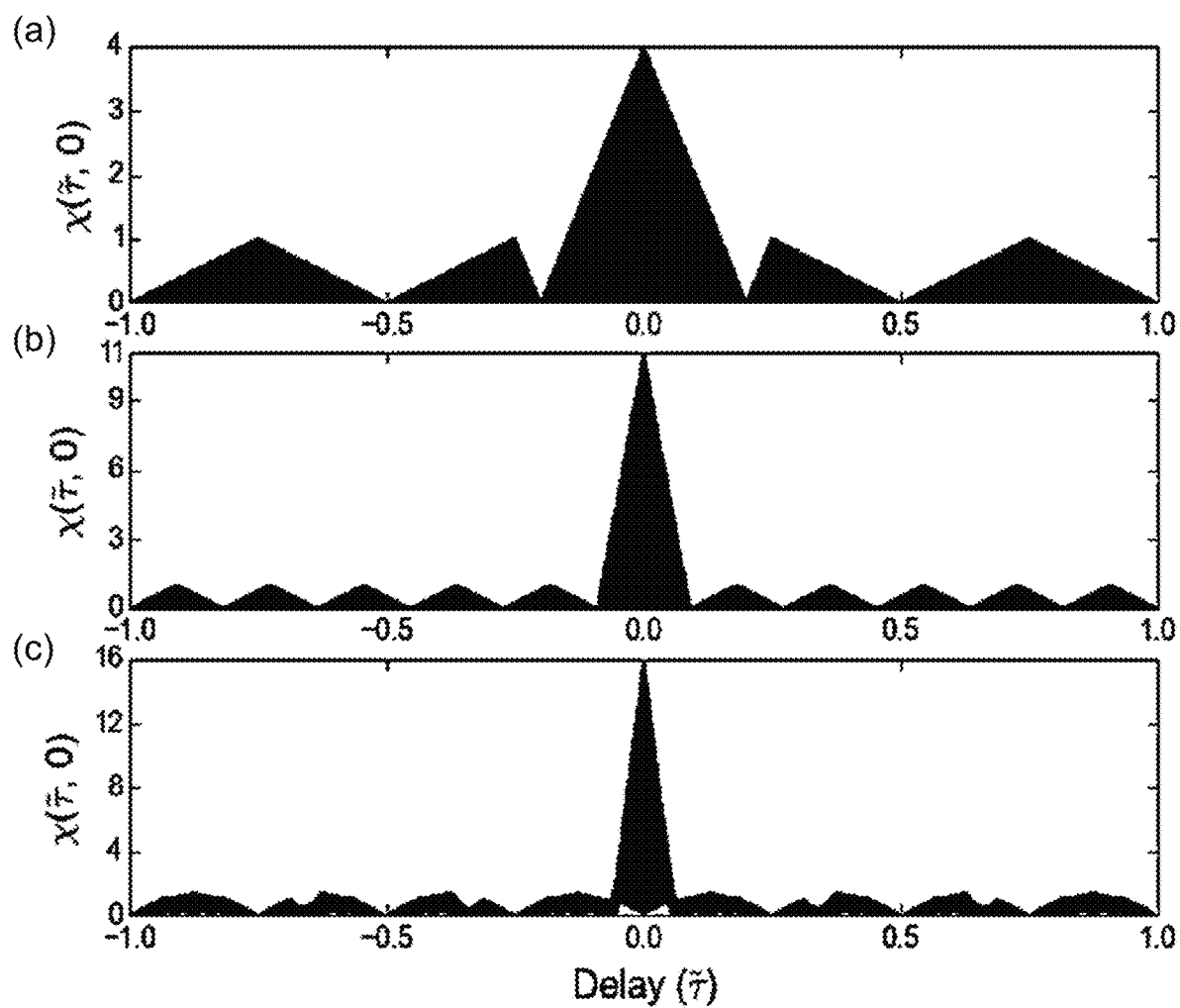
FIG. 14: Time Resolution Pulse Compression (a) Barker 4; (b) Barker 11; (c) Frank 16.

The figures also show that delay is severely detrimental to the matched filter output peak due to the unexpected phase shift of each carrier. This means that in addition to Doppler detection capability, these waveforms have good time resolution properties. FIG. 12 and FIG. 14 compare the time resolutions for three codes mapped to the waveforms presented here versus their standard pulse compression waveform representation.

FIG. 12 shows that the time resolution improves as the number of code elements increases, and as the number of allowed phases increases. This shows that unexpected phase shifts affect longer and more complex codes more severely.

Experimental Results

Figure 13:
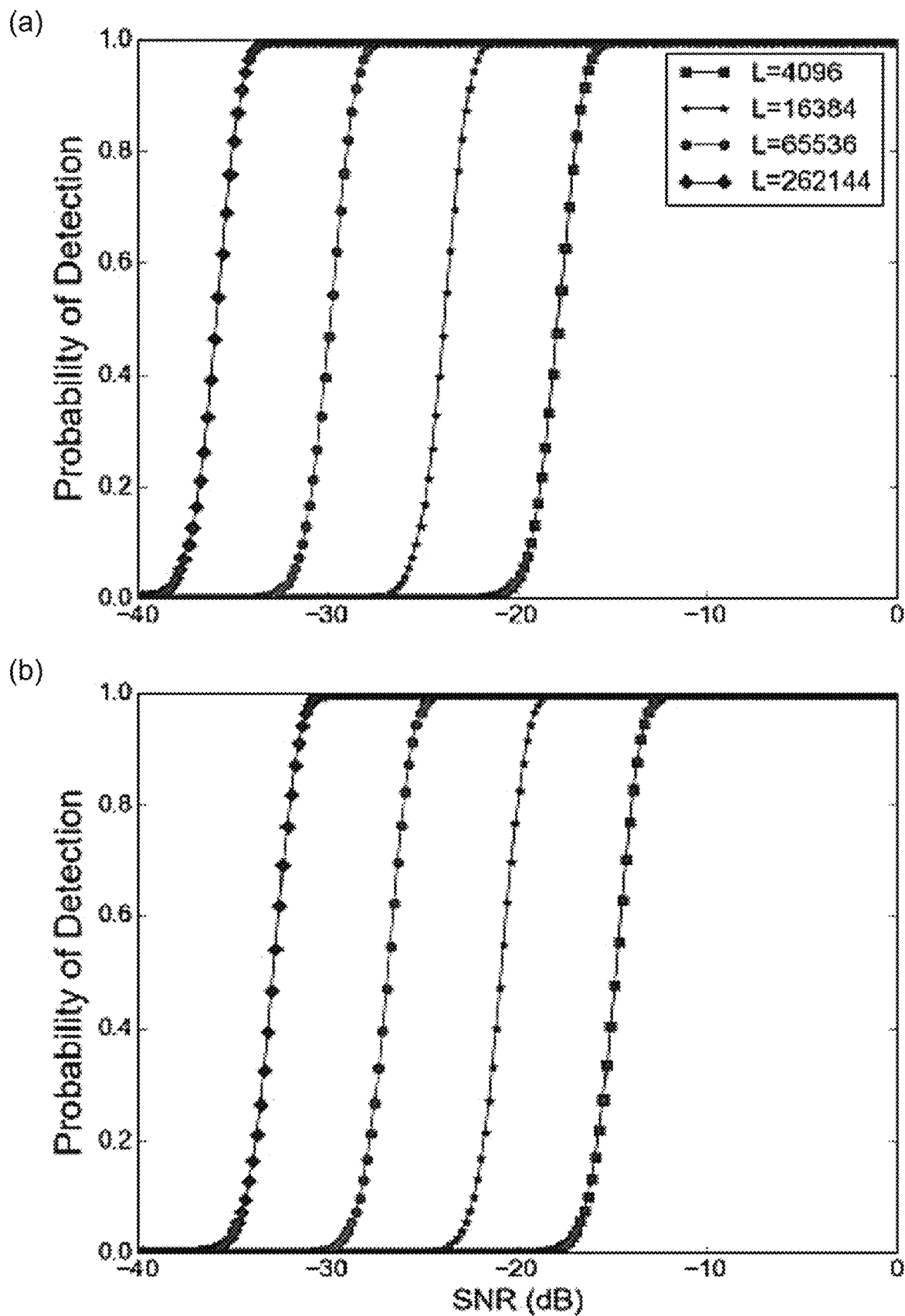
FIG. 13: Probability of Detection $P_{FA}$=1-16 (a) Barker 4 and 11; (b) Frank 16.
Figure 15:
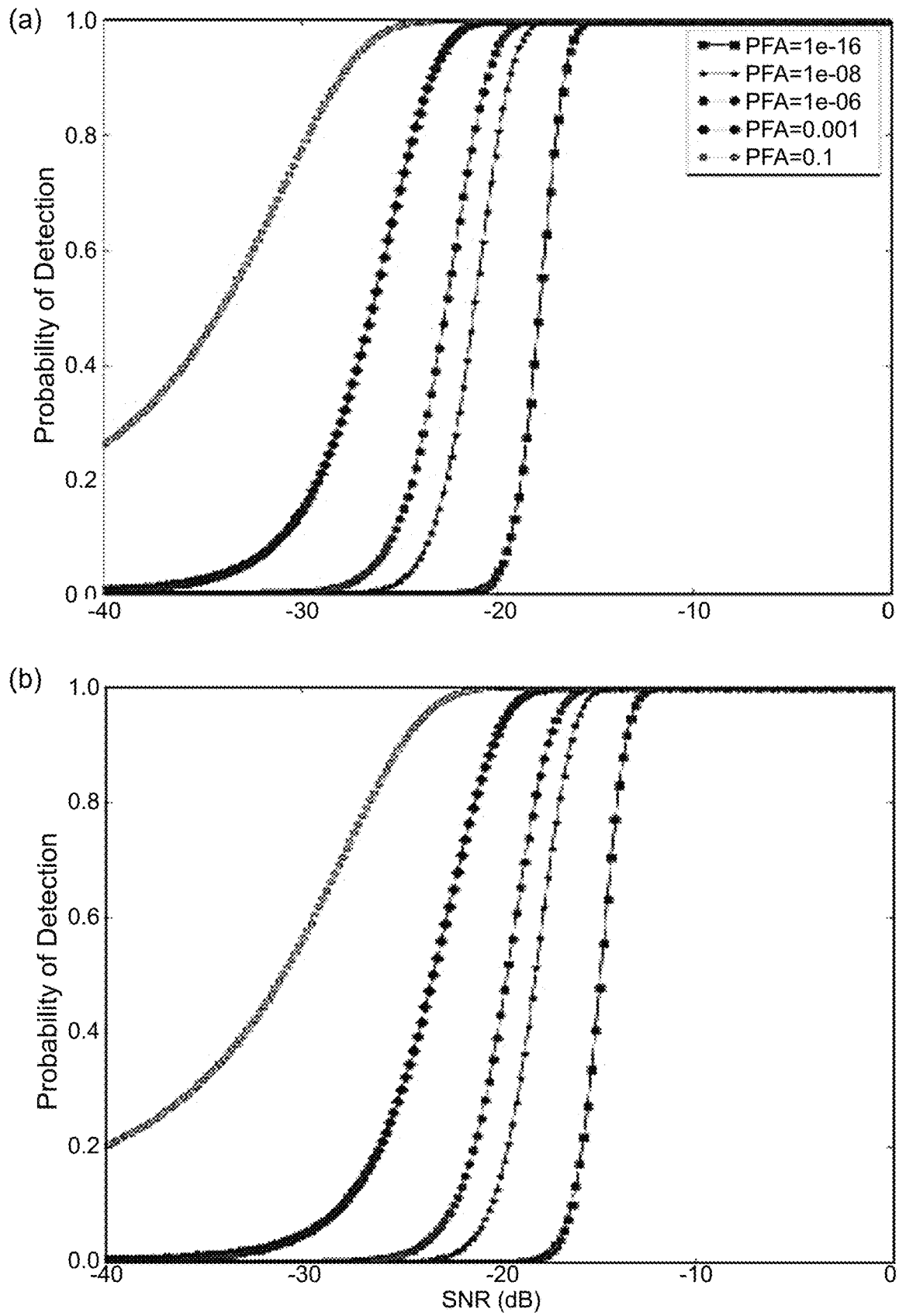
FIG. 15: Probability of Detection L=212 (a) Barker 4 and 11; (b) Frank 16.

FIG. 13 shows the probability of detection given a prescribed probability of false alarm of $P_{FA}=1^{-16}$ for various sampled lengths L of the waveform. FIG. 15 shows the probability of detection given a sampled length L=4096 for various acceptable levels of $P_{FA}$. FIG. 13 clearly illustrates a gain in detection performance resulting from an increase in the sampled length by virtue of the increase in SNR due to the coherent integration in the Fourier transform. This, along with the derivation in the "Receiver" Section above, shows that frequency domain codes will in general be able to tolerate lower SNRs than time domain codes.

Figure 16:
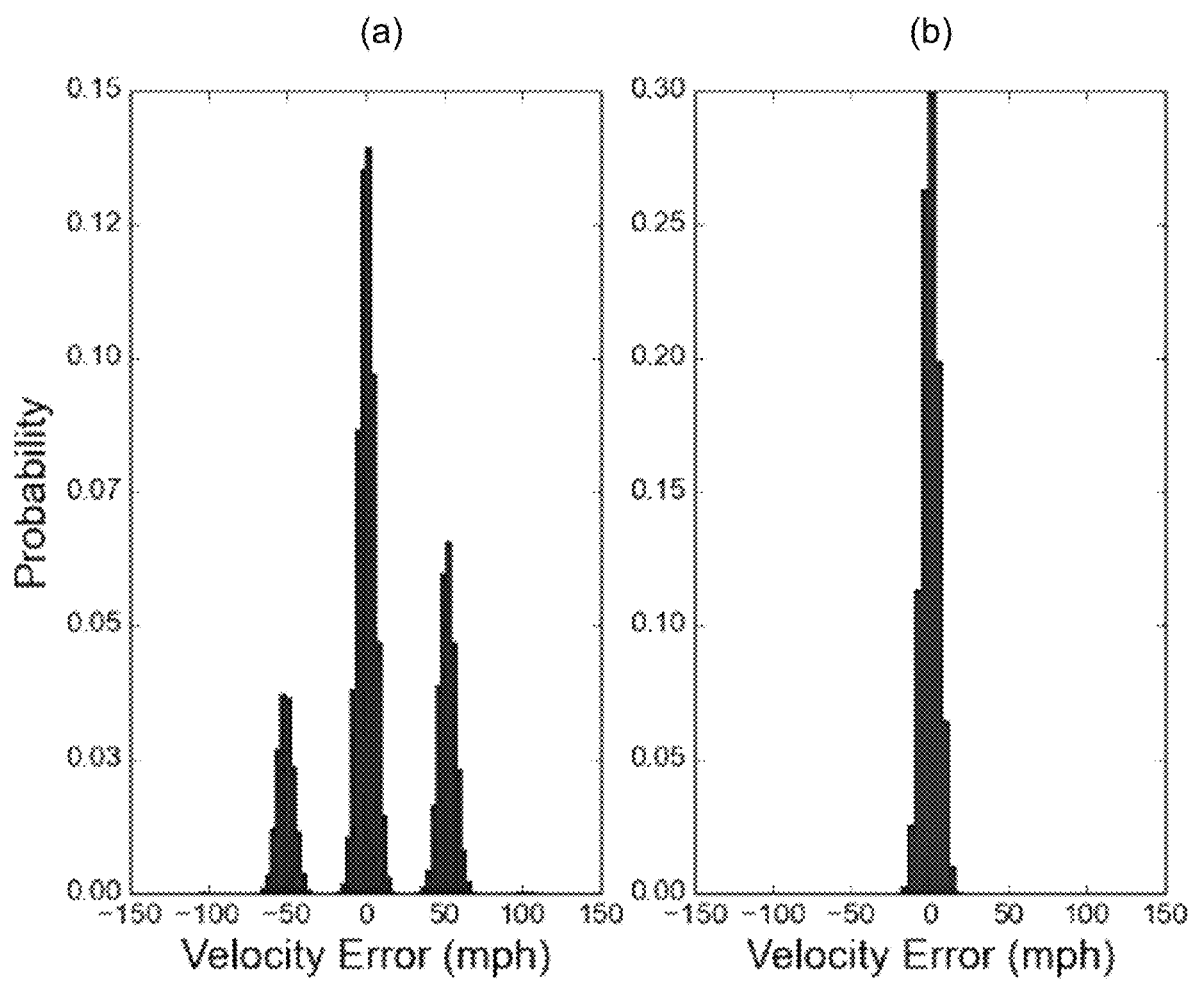
FIG. 16: Barker 4 Velocity Estimation Error Histogram L=16384 (a) SNR=−15 dB (b) SNR=0 dB.

FIG. 16 shows the distribution in the error in the velocity measurement for L=16384 for SNRs of −15 dB and 0 dB using a CZT frequency spacing allowing a 50 mph velocity resolution. It shows that even when $P_D$=1, the noise may still give adjacent warped frequency bins more energy. The error is reduced by increasing the length of the signal, thereby narrowing the mainlobe of T in the warped frequency domain.

For lower speed targets that change their speed often, a high Doppler resolution may be advantageous, which means a tight CZT frequency spacing. This will increase a probability of choosing the incorrect warped frequency bin for the Doppler shifted carrier, therefore it may be advantageous to increase the signal length. Thus, the better the Doppler resolution needed, the longer the waveform needed.

Further Embodiments

The present disclosure may be embodied as a radar receiver. The radar receiver includes an analog-to-digital converter to sample a received radar signal at a sampling frequency to generate a digital signal. In some embodiments, the radar receiver includes an antenna for receiving the radar signal. A buffer may be configured to hold (e.g., receive and/or store) L samples of the digital signal.

The radar receiver may include a multibandpass filter. For example, the radar receiver may have a plurality of zero-phase bandpass filters, wherein each of the bandpass filters has a center frequency at a different one of a plurality of carrier frequencies and a pre-determined bandwidth. A combiner is configured to combine a result of each bandpass filter into the digital signal to be acted upon by the transformer (below).

The radar receiver includes a transformer for converting the digital signal to a frequency domain signal. For example, the transformer may utilize a Chirp Z-Transform to convert the digital signal into a frequency domain signal.

A warper is configured to warp positive frequencies of each of a real component of the frequency domain signal and an imaginary component of the frequency domain signal onto a logarithmic frequency axis. For example, the negative frequencies of the frequency domain signal are discarded and the remaining frequency domain signal is split into its real and imaginary components. Each of the real and imaginary components are warped according to Eq. (1) to generate a warped frequency domain signal (the complex warped spectrum). The warper may use Lanczos interpolation of the real and imaginary components of the frequency domain signal.

A convolver (matched filter) is configured to convolve a matched filter with the warped frequency domain signal. The matched filter may be given by Eq. (43). A thresholder is configured to detect a target signal (at least one target signal) in the convolved signal (output of the matched filter).

The present disclosure may be embodied as a method for receiving radar signals. In some embodiments, the method includes converting a received radar signal to a digital signal at a sampling frequency. The may be accomplished by an analog-to-digital converted (ADC). For example, the (analog) received signal may be sampled at a sampling frequency, to produce a digital signal.

The digital signal is transformed to a frequency domain signal. For example, a CZT may be used to convert the digital signal from a time domain to a frequency domain. The positive frequencies of the frequency domain signal warped by warping each of a real component and an imaginary component onto a logarithmic frequency axis. For example, the positive frequencies may be warped using Lanczos interpolation of the real and imaginary components of the frequency domain signal onto the warped (e.g., logarithmic) frequency axis.

A matched filter is convolved with the warped frequency domain signal. The convolved signal (output of the matched filter) is thresholded to detect a target signal in the convolved signal.

In some embodiments, the method may include filtering the digital signal using a plurality of zero-phase bandpass filters, each having a center frequency at a different one of a plurality of carrier frequencies (e.g., expected carrier frequencies making up an expected received signal). Each of the bandpass filters has a (pre-determined) bandwidth selected to include an expected Doppler shift (maximum).

In some embodiments, the method includes determining a Doppler shift of the detected target signal based on a difference between the target signal in the warped frequency domain signal and the convolved signal.

In some embodiments, a radar receiver and/or a radar transmitter may utilize a processor configured to perform a method according to any of the embodiments herein. In some embodiments, a processor may be configured to perform one or more subsets of a method according to any of the embodiments herein (e.g., transform a received signal to a digital signal, warp real and imaginary components of the digital signal, etc.) Such a processor may be in communication with and/or include a memory. The memory can be, for example, a random-access memory (RAM) (e.g., a dynamic RAM, a static RAM), a flash memory, a removable memory, and/or so forth. In some instances, instructions associated with performing the operations described herein can be stored within the memory and/or a storage medium (which, in some embodiments, includes a database in which the instructions are stored) and the instructions are executed at the processor.

In some instances, the processor includes one or more modules and/or components. Each module/component executed by the processor can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general purpose processor, a central processing unit (CPU), an accelerated processing unit (APU), a field-programmable gate array (FPGA), an application specific integrated circuit (ASIC), a digital signal processor (DSP), and/or the like.

In another aspect, the present disclosure may be embodied as a non-transitory computer-readable medium having stored thereon a computer program for instructing a processor to perform any of the methods described herein.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof

What is claimed is:

1. A radar receiver, comprising:
   an analog-to-digital converter to sample a received radar signal at a sampling frequency to generate a digital signal;
   a transformer for converting the digital signal to a frequency domain signal;
   a warper configured to warp positive frequencies of each of a real component of the frequency domain signal and an imaginary component of the frequency domain signal onto a logarithmic frequency axis;
   a convolver configured to convolve a matched filter with the warped frequency domain signal;
   a thresholder configured to detect a target signal in the convolved signal.

2. The radar receiver of claim 1, further comprising a buffer configured to receive L samples of the digital signal.

3. The radar receiver of claim 1, further comprising a multibandpass filter.

4. The radar receiver of claim 3, wherein the multibandpass filter comprises:
   a plurality of zero-phase bandpass filters, wherein each of the bandpass filters has a center frequency at a different one of a plurality of carrier frequencies and a pre-determined bandwidth; and
   a combiner configured to combine a result of each bandpass filter.

5. The radar receiver of claim 1, wherein the transformer is configured to convert the digital signal using a Chirp Z-Transform (CZT).

6. The radar receiver of claim 1, further comprising an antenna configured to receive the radar signal.

7. The radar receiver of claim 1, further comprising a shift calculator configured to determine a Doppler shift of the target signal based on a difference between the warped frequency domain signal and the convolved signal.

8. The radar receiver of claim 1, wherein the warper uses Lanczos interpolation of the real and imaginary components of the frequency domain signal.

9. A method for receiving radar signals, comprising:
   converting a received radar signal to a digital signal at a sampling frequency;
   transforming the digital signal to a frequency domain signal;
   warping positive frequencies of each of a real component of the frequency domain signal and an imaginary component of the frequency domain signal onto a logarithmic frequency axis;
   convolving a matched filter with the warped frequency domain signal; and
   thresholding the convolved signal to detect a target signal.

10. The method of claim 9, further comprising filtering the digital signal using a plurality of zero-phase bandpass filters, each having a center frequency at a different one of a plurality of carrier frequencies and a pre-determined bandwidth.

11. The method of claim 9, wherein CZT is used to transform the digital signal to a frequency domain signal.

12. The method of claim 9, further comprising determining a Doppler shift of the detected target signal based on a difference between the target signal in the warped frequency domain signal and the convolved signal.

13. The radar receiver of claim 9, wherein warping positive frequencies uses Lanczos interpolation of real and imaginary components of the frequency domain signal.

* * * * *